(12) United States Patent
Jeran et al.

(10) Patent No.: US 10,372,898 B2
(45) Date of Patent: *Aug. 6, 2019

(54) PROTECTING DATA IN MEMORY OF A CONSUMABLE PRODUCT

(71) Applicant: HEWLETT-PACKARD DEVELOPMENT COMPANY, L.P., Houston, TX (US)

(72) Inventors: Paul L. Jeran, Boise, ID (US); Stephen D. Panshin, Corvallis, OR (US); Jefferson P. Ward, Brush Prairie, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,850

(22) Filed: Oct. 23, 2017

(65) Prior Publication Data

US 2018/0046795 A1 Feb. 15, 2018

Related U.S. Application Data

(63) Continuation of application No. 14/904,639, filed as application No. PCT/US2013/052872 on Jul. 31, 2013, now Pat. No. 9,852,282.

(51) Int. Cl.
| | |
|---|---|
| *H04L 29/06* | (2006.01) |
| *G06F 21/44* | (2013.01) |
| *B41J 2/175* | (2006.01) |
| *H04L 9/32* | (2006.01) |

(52) U.S. Cl.
CPC .......... *G06F 21/44* (2013.01); *B41J 2/17546* (2013.01); *G06F 21/445* (2013.01); *H04L 9/3247* (2013.01)

(58) Field of Classification Search
CPC ...................................................... G06F 21/44
See application file for complete search history.

(56) References Cited

U.S. PATENT DOCUMENTS

| | | | |
|---|---|---|---|
| 5,479,530 A * | 12/1995 | Nair ...................... | G06Q 20/04 382/119 |
| 5,704,021 A | 12/1997 | Smith et al. | |
| 6,522,348 B1 | 2/2003 | Brot et al. | |
| 6,738,903 B1 | 5/2004 | Haines | |
| 7,010,605 B1 | 3/2006 | Dharmarajan | |
| 7,212,637 B2 | 5/2007 | Salisbury | |
| 7,221,473 B2 | 5/2007 | Jeran | |
| 7,962,051 B2 | 6/2011 | Kim | |

(Continued)

FOREIGN PATENT DOCUMENTS

| | | |
|---|---|---|
| CN | 101659159 | 3/2010 |
| CN | 102112958 | 6/2011 |

(Continued)

OTHER PUBLICATIONS

"Service for the Aftermarket of the Printer Cartridge Chips"; http://www.semiresearch.com/index.php?1200727499; Date Pulled from Online: Jan. 12, 2016.

(Continued)

*Primary Examiner* — Shawnchoy Rahman (57) ABSTRACT

A non-transitory memory storing a digital signature of a consumable product where the digital signature indicates that an identifier and host device setting data are from a trusted source.

19 Claims, 5 Drawing Sheets

(56) References Cited

U.S. PATENT DOCUMENTS

| | | | |
|---|---|---|---|
| 8,161,199 | B1 | 4/2012 | Weiser |
| 8,977,824 | B2 | 3/2015 | Sekiya |
| 9,075,957 | B2 * | 7/2015 | Sela ................ G06F 21/10 |
| 2003/0025939 | A1 | 2/2003 | Jeran et al. |
| 2003/0063311 | A1 | 4/2003 | Covitt et al. |
| 2004/0181681 | A1 | 9/2004 | Salisbury |
| 2005/0073731 | A1 | 4/2005 | Deer |
| 2005/0210179 | A1 | 9/2005 | Walmsley |
| 2005/0214002 | A1 | 9/2005 | Baruch |
| 2005/0228874 | A1 * | 10/2005 | Edgett ................ H04L 63/08 709/220 |
| 2007/0079125 | A1 | 4/2007 | Adkins et al. |
| 2007/0234041 | A1 * | 10/2007 | Lakshmeshwar ..... H04L 9/3271 713/156 |
| 2008/0154799 | A1 | 6/2008 | Campagna |
| 2008/0237333 | A1 | 10/2008 | Fukuda |
| 2008/0255775 | A1 | 10/2008 | Beard |
| 2010/0199089 | A1 * | 8/2010 | Vysogorets ............. G06F 21/34 713/168 |
| 2011/0069354 | A1 | 3/2011 | Lapstun |
| 2011/0154043 | A1 | 6/2011 | Lim |
| 2011/0170146 | A1 | 7/2011 | Simpson et al. |
| 2012/0134687 | A1 | 5/2012 | Jones et al. |
| 2014/0099887 | A1 | 4/2014 | Flanagan |
| 2014/0281554 | A1 | 9/2014 | Malesky |
| 2014/0307651 | A1 * | 10/2014 | Sarikaya ............... H04W 76/11 370/329 |

FOREIGN PATENT DOCUMENTS

| | | |
|---|---|---|
| CN | 102173233 | 9/2011 |
| JP | 2002-127550 | 5/2002 |
| JP | 2002-366008 | 12/2002 |
| JP | 2005-251156 | 9/2005 |
| JP | 2006-047579 | 2/2006 |
| JP | 2007-199361 | 8/2007 |
| JP | 2009-196366 | 9/2009 |
| JP | 2011-177932 | 9/2011 |
| KR | 2006-0090262 | 5/2006 |
| KR | 2012-0004756 | 7/2010 |
| RU | 2300464 C2 | 9/2005 |
| RU | 2446056 C2 | 4/2009 |
| TW | 201016473 A1 | 5/2010 |
| WO | WO-2010033110 | 3/2010 |

OTHER PUBLICATIONS

Majorvariola; "Digital Signature"; Wikipedia; Jul. 29, 2013.

* cited by examiner

PROTECTING DATA IN MEMORY OF A CONSUMABLE PRODUCT

BACKGROUND

Authentication is a process of proving or verifying that information is genuine. Authentication processes can use different mechanisms to ensure that the information is genuine. In one example, a consumable product includes a memory, and the memory includes a consumable product identifier. A host device that receives the consumable product can identify the consumable product by reading the identifier stored in the memory.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Digital signatures can be used as part of an authentication protocol by storing an identifier in the digital signature. An authenticating engine can request the identifier to determine whether the identifier matches what the authenticating engine expects the identifier to be. Some signature schemes allow the recovery of data when the signature is verified and have enough bit space to accommodate an identifier and other data.

The principles described herein include a non-transitory memory to store a digital signature of a consumable product where the digital signature indicates an identifier and host device setting data are from a trusted source. For example, the extra bit space in the digital signature is utilized for setting data. For example, during an authentication session, the signature verification process can determine whether the setting data, in additional to the identifier stored in the digital signature, appears to be authentic.

Also, storing data in a digital signature or in the signed data may provide for a relatively tamper resistant mechanism for storing data. Thus, the digital signature can store data that is valuable to the operation of the consumable product and/or the device that is associated with the consumable product in a relatively secure manner. For example, if the consumable product is a print cartridge, the digital signature can store setting data that indicates how the printer should operate with the print cartridge by providing temperature settings, service parameters, printer functional data, other data, or combinations thereof. In some examples, the setting data contains other types of information such as uniform resource locators (URL), hyperlinks, other types of information, or combinations thereof.

In the following description, for purposes of explanation, numerous specific details are set forth in order to provide a thorough understanding of the present systems and methods. Reference in the specification to "an example" or similar language means that a particular feature, structure, or characteristic described is included in at least that one example, but not necessarily in other examples.

Figure 1A:
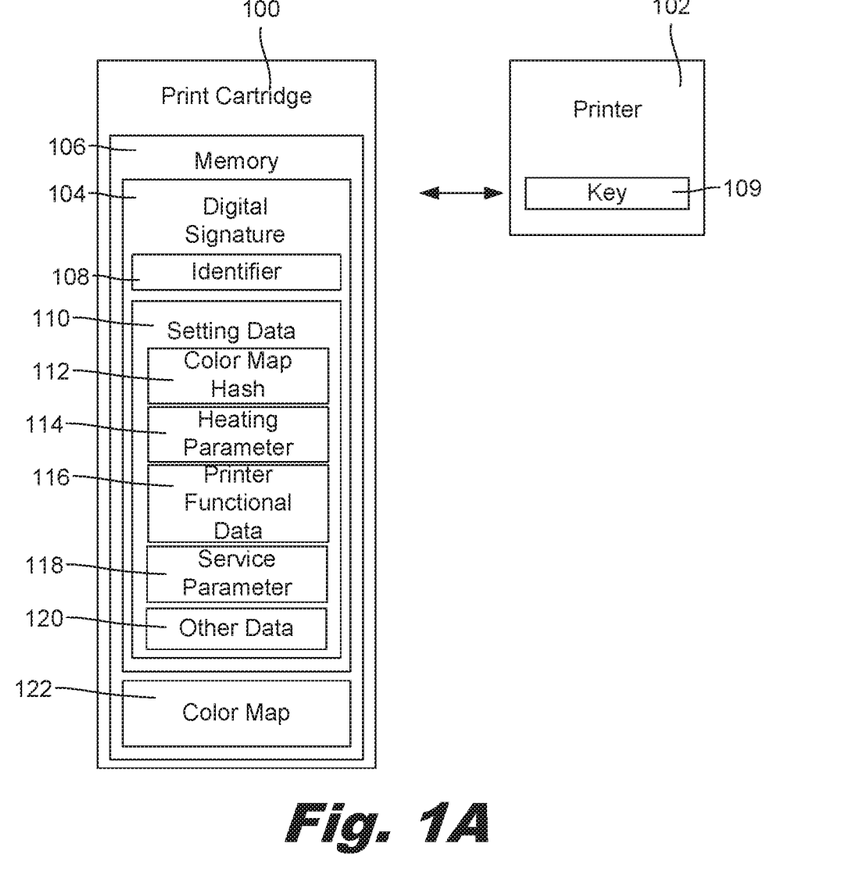
FIG. 1A is a diagram of an example of a consumable product and a device according to the principles described herein.

FIG. 1A is a diagram of an example of a consumable product and a device according to the principles described herein. In this example, the consumable product is a print cartridge (100) and the device is a printer (102). The print cartridge (100) may provide any appropriate supply to the printer including ink, dry toner, wet toner, liquids, other materials, or combinations thereof. While this example is described with reference to the consumable product specifically being a print cartridge, any appropriate consumable product may be used. For example, the consumable product may be an oil filter, an air filter, another type of filter, a print cartridge, a pharmaceutical or forensic fluid container, an erosion prone component of a machine, another type of component, or combinations thereof. Further, while this example is described with reference to specific types of devices, any appropriate type of device may be used in accordance with the principles described herein. For example, the device (102) may be a two dimensional printer, a three dimensional printer, an automobile, a vehicle, a plane, a boat, construction equipment, machines, other types of devices, or combinations thereof.

In the example of FIG. 1A, the print cartridge (100) contains a digital signature (104) that is contained in memory (106). The digital signature (104) signs data stored in the cartridge that contains an identifier (108) that is unique to the print cartridge (100). In response to being inserted into the appropriate receptacle in the printer (102), the printer (102) and the print cartridge (100) are positioned to communicate with one another. For example, the printer's receptacle may include electrical contacts that are positioned to abut electrical contacts of the print cartridge (100), which completes an electrically conductive pathway on which the printer (102) and the print cartridge (100) can exchange data. In other examples, the receptacle is positioned such that the print cartridge (100) can wirelessly communicate with the printer (102). In response to being able to communicate, an authentication session between the printer (102) and the print cartridge (100) is initiated. The print cartridge (100) may request authentication to initiate the authentication session. However, in other examples, the printer (102) initiates the authentication session.

The printer may use a key (109), a symmetric key, another mechanism, or combinations thereof to interpret the digital signature (104). If the digital signature (104) does not appear to be genuine, the printer (102) will deny authentication. However, if the digital signature (104) appears to be genuine, the printer (102) determines whether setting data (110) stored in the digital signature (104) is also authentic. For example, the digital signature (104) may include a hash, such as a color map hash (112), a heating parameter (114), printer functional data (116), a service parameter (118), or other data (120). The printer (102) may use any block of the setting data for additional authentication. For example, the printer (102) may use all of the setting data during the authentication protocol, or the printer (102) may select specific blocks of setting data (110) to use for authentication. The printer (102) may use the key (109) to determine that the selected block of setting data (110) is what the printer (102) expects the setting data to be.

In examples where a hash is stored in the digital signature (104), the hash may be constructed from information that is not stored in the digital signature (104). For example, a color map hash (112) may be stored in the digital signature (104). The color map hash (112) represents the information that creates the color map (122) that is stored in the print cartridge's memory (106), but not in the digital signature (104). The color map (122) represents the color combinations that the print cartridge will use to make specific types of colors. The color map (122) may be based on a red, blue, and green (RBG) color map model; a cyan, magenta, yellow, and key (CMYK) color model; another type of color map model; or combinations thereof. The color map (122) may also include the information that enables the color map hash (112) to be constructed. The printer (102) may cause the color map hash (112) to be constructed from the color map (122). The printer (102) may compare the memory hash constructed from the color map to the digital signature hash. If the hashes match, the printer's authenticating engine may determine that the print cartridge is authentic. If the hashes fail to match, the printer's authenticating engine may deny authentication.

In response to denying authentication, the printer (102) may (i) cease using the print cartridge (100), (ii) continue to use the print cartridge (100), or (iii) continue to use the print cartridge (100) while recognizing that warranties connected to the printer (102) are being compromised.

In an example, internet connectivity does not have to be established at the time that the print cartridge is installed. In such example, the printer can use the print cartridge with confidence of its authenticity immediately without having to wait to begin the authentication process.

In some examples, the printer begins the authentication session by first attempting to authenticate the hardware of the print cartridge. If authentication of the hardware is successful, the printer continues to authenticate the digital signature stored in the print cartridge. Thus, the authentication of the digital signature is a second layer of protection to determine if the print cartridges are genuine. If both the digital signature and the hardware appear to be genuine, the printer then determines whether the setting data appears to be genuine. Thus, the setting data can act as a third or an additional layer of protection. While this example has been described with reference to specific layers of protection to determine whether a consumable product is genuine, any appropriate number of layers may be implemented in accordance with the principles described herein. Any appropriate layer to determine authenticity may be implemented in any appropriate order. Further, additional types of layers not described in this specification may also be implemented as other layers, which may be inserted into the authentication process in any appropriate sequence.

For example, storing the setting data (110) in the digital signature or in the signed data (104) may protect the setting data from corruption or tampering. Thus, the setting data (110) is less prone to changes when it is stored in the digital signature (104). In examples where the print cartridge stores at least some of the printer functional data (116), which is data that determines how the printer will operate, the printer functional data (116) can be stored in the digital signature (104). In this manner, the printer (102) can rely on accurate printer functional data (116) that is less prone to inaccuracies. For example inaccurate printer functional data (116) could result in accelerating the wear on the printer (102), damaging the paper used in the printer (102), applying the wrong color to the paper, other undesirable results, and combinations thereof.

The printer (102) may continue to have access to the setting data after the authentication session is completed. In this manner, the printer (102) can retrieve the printer functional data (116) as desired.

While the example above has been described with the identifier and the setting data (or hashes of the setting data) being located within the digital signature, in other examples, the identifier, setting data, and/or appropriate hashes, are stored in the signed data associated with the digital signature. Regardless of whether the identifier, the setting data, and/or hashes thereof are stored in the data associated with the digital signature or are actually located in the digital signature itself, the digital signature indicates that the identifier, setting data, hashes thereof are from a trusted source.

Figure 1B:
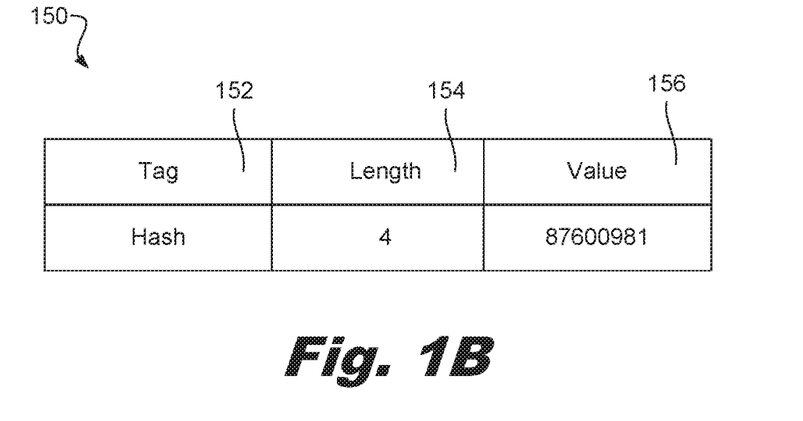
FIG. 1B is a diagram of an example of setting data stored in a tag, length, value (TLV) format according to the principles described herein.

FIG. 1B is a diagram of an example of setting data stored in a tag-length-value (TLV) format (150) according to the principles described herein. A TLV format (150) allows data to be searched and retrieved easily. The tag section (152) of the TLV format (150) is written with alphanumeric characters and indicates the type of information in the setting data. In this example, the tag section (152) indicates that the setting data represents a hash. However, in other examples, the tag section can indicate that the data belongs to printer functional data, service parameters, heating parameters, rewards, incentives, identifiers, other types of data, or combinations thereof.

The length section (154) indicates the length of the data that is to follow. In this example, the length section (154) indicates that four bytes will follow. The value section (156) is the data. In this example, the number 87600981 represents the hash.

Data stored in TLV formats are easily searched using generalized parsing functions. Further, new elements which are received at an older node can be safely skipped and the rest of the message can be parsed. This is similar to the way that unknown Extensible Markup Language (XML) tags can be safely skipped. Additionally, TLV elements can be placed in any order inside the message body, and TLV elements are often used in a binary format which makes parsing faster and the data smaller. In some examples, it may be easier to generate XML from data stored in a TLV format than to make human inspection of the data.

While this example has been described with reference to a specific format for storing the setting data, any appropriate format may be used to store the setting data in accordance with the principles described herein. For example, the data may be stored using text based fields, static fields, other fields, or combinations thereof.

Figure 2:
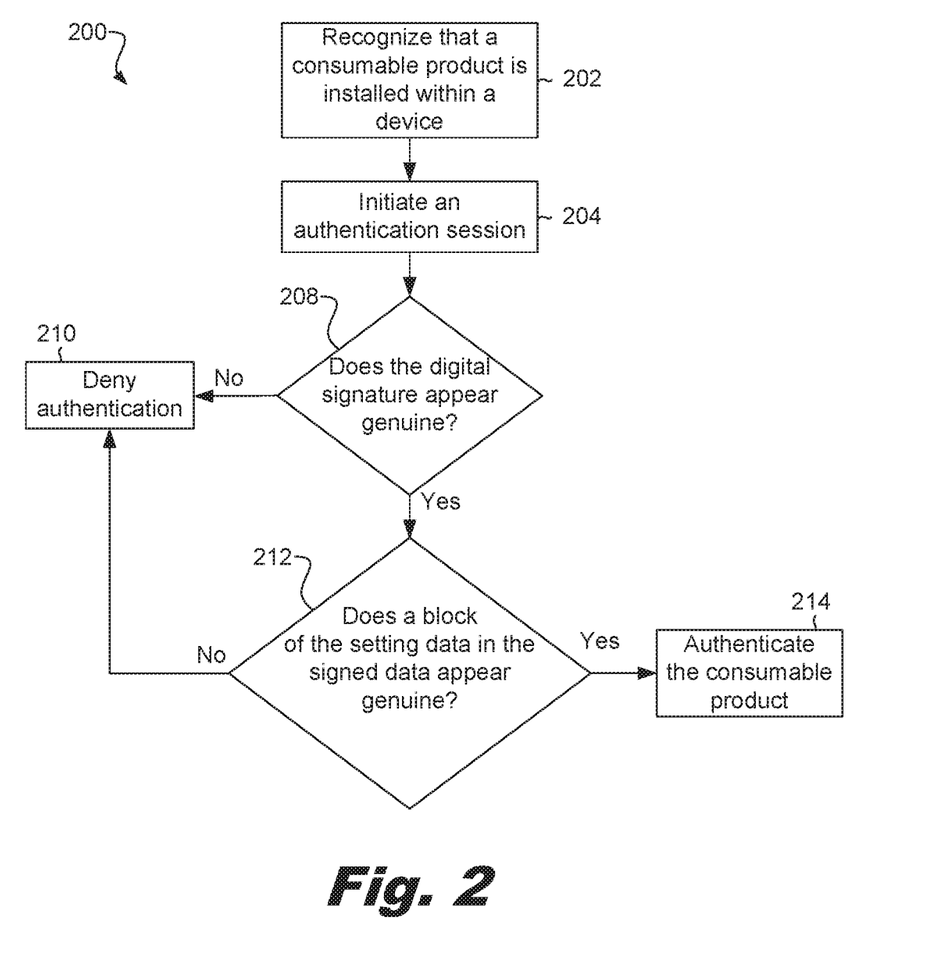
FIG. 2 is a flowchart of an example of a method for protecting data in memory of a consumable product according to the principles described herein.

FIG. 2 is a flowchart (200) of an example of a method for protecting data in memory of a consumable product according to the principles described herein. In this example, the method includes recognizing (202) that a consumable product is installed within a device and initiating (204) an authentication session with the consumable product.

The method also includes determining (208) whether the digital signature appears genuine. If the digital signature does not appear genuine, authentication is denied (210). On the other hand, if the digital signature appears genuine, the method continues with determining (212) whether a block of the setting data in the digital signature appears genuine. If the block of setting data does not appear to be genuine, authentication is denied (210). On the other hand, if the block of setting data does appear to be genuine, the consumable product is authenticated (214). The method may use all of the blocks of setting data, a subset of the blocks of setting data, or just a single block of setting data to authenticate the consumable product.

Figure 3:
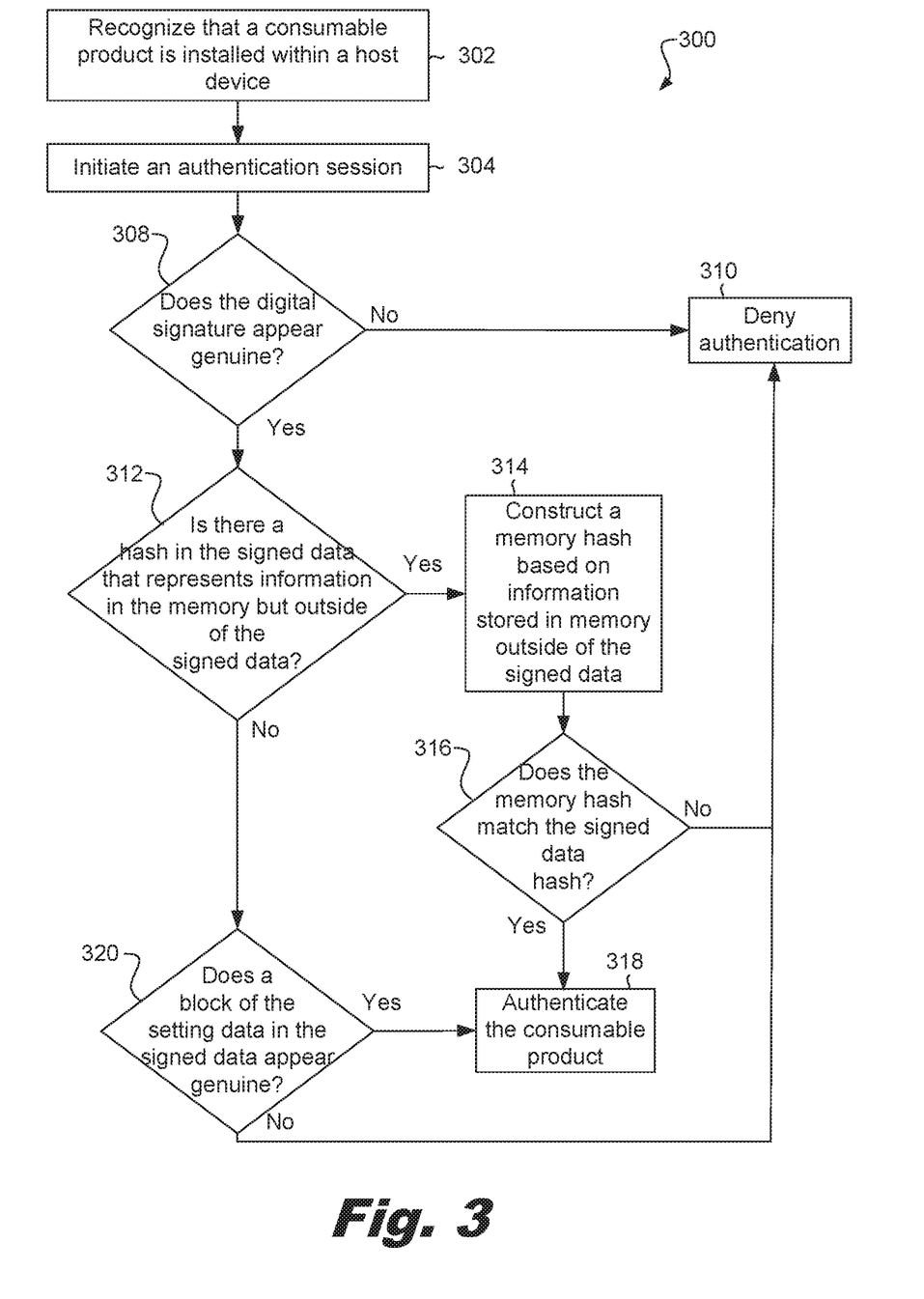
FIG. 3 is a flowchart of an example of a method for protecting data in memory of a consumable product according to the principles described herein.

FIG. 3 is a flowchart (300) of an example of a method for protecting data in memory of a consumable product according to the principles described herein. In this example, the method includes recognizing (302) that a consumable product is installed within a device and initiating (304) an authentication session with the consumable product.

The method also includes determining (308) whether the digital signature appears genuine. If the digital signature does not appear genuine, authentication is denied (310). On the other hand, if the digital signature appears genuine, the method continues with determining (312) whether a hash in the digital signature that represents information in the memory, but outside of the digital signature exists. If such a hash exists, the method continues by constructing (314) a memory hash based on information stored in memory outside of the digital signature. The method determines (316) whether the memory hash matches the hash in the digital signature. If there is a match, the consumable product is authenticated (318). If the hashes do not match, then authentication is denied (310).

If there is no hash in the digital signature, the method continues by determining (320) whether a block of the setting data in the digital signature appears genuine. If the block of setting data does not appear to be genuine, authentication is denied (310). On the other hand, if the block of setting data does appear to be genuine, the consumable product is authenticated (318). The method may use all of the blocks of setting data, a subset of the blocks of setting data, or just a single block of setting data to authenticate the consumable product.

Figure 4:
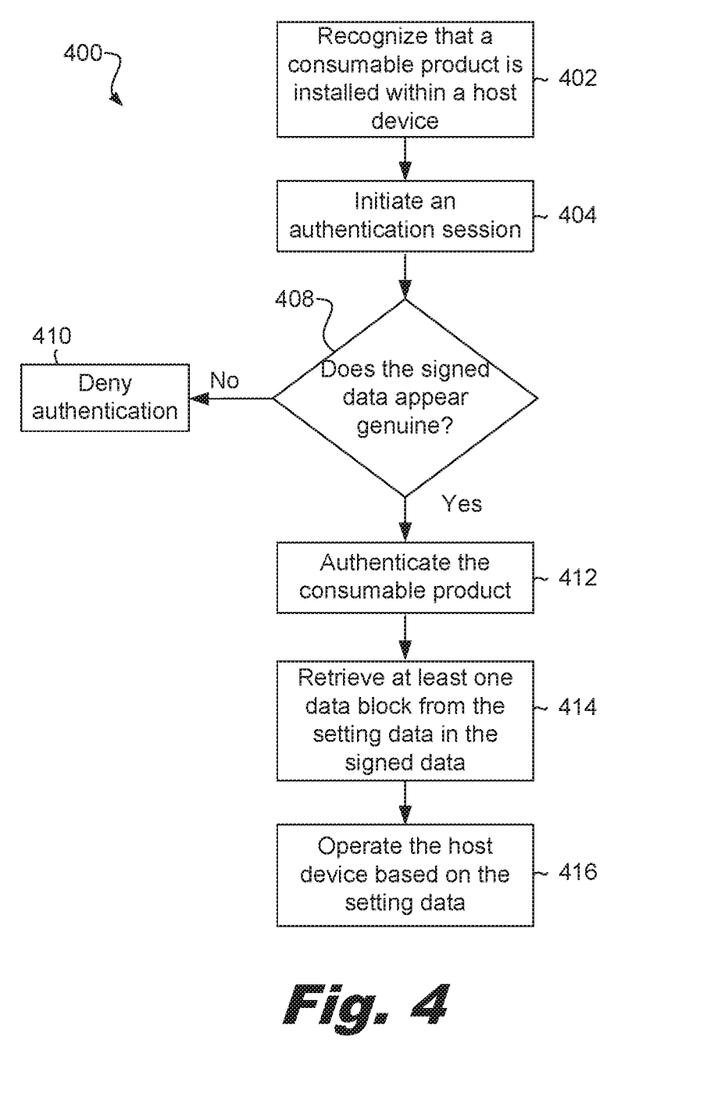
FIG. 4 is a flowchart of an example of a method for protecting data in memory of a consumable product according to the principles described herein.

FIG. 4 is a flowchart (400) of an example of a method for protecting data in memory of a consumable product according to the principles described herein. In this example, the method includes recognizing (402) that a consumable product is installed within a device and initiating (404) an authentication session with the consumable product.

The method also includes determining (408) whether the digital signature appears genuine. If the digital signature does not appear genuine, authentication is denied (410). On the other hand, if the digital signature appears genuine, the method continues with authenticating (412) the consumable product. Also, at least one block from the setting data in the digital signature is retrieved (414), and the host device is operated (416) based on the retrieved setting data.

While the above examples have been described with reference to specific mechanisms for authenticating the consumable product with the setting data, any appropriate authenticating mechanism may be used in accordance with the principles described herein. For example, the authenticating mechanism may include constructing a hash, interpreting at least one block of setting data with a public key, using at least one block of setting data, using selected blocks of setting data, other mechanisms, or combinations thereof.

Figure 5:
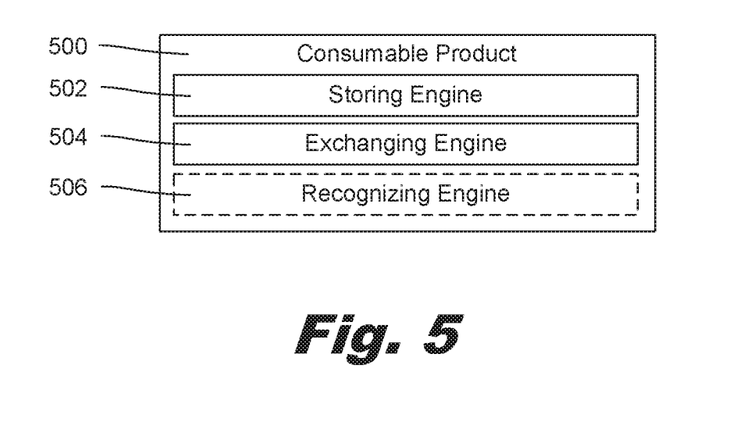
FIG. 5 is a diagram of an example of a consumable product according to the principles described herein.

FIG. 5 is a diagram of an example of a consumable product (500) according to the principles described herein. The consumable product (500) includes a storing engine (502) and an exchanging engine (504). In this example, the consumable product (500) also includes a recognizing engine (506). The engines (502, 504, 506) refer to a combination of hardware and computer readable instructions to perform a designated function. Each of the engines (502, 504, 506) may include a processor and memory. The computer readable instructions are stored in the memory and cause the processor to execute the designated function of the engine.

The storing engine (502) stores an identifier in a memory of the consumable product that is unique to the consumable product. The recognizing engine (506) recognizes that the consumable product is in communication with the host device and that the consumable product should be subjected to an authentication process. The host device may include an authentication engine that initiates the authentication session between the consumable product and the host device. In response to requests from the host device's authentication engine, the consumable product sends the requested information with the exchanging engine (504). For example, the authentication engine may request an identifier in the digital signature. If the digital signature and identifier contained in the memory of the consumable product appear to be genuine, then the authentication engine continues to determine the consumable product's authenticity by determining whether the setting data stored in the digital signature also appears to be genuine. The authentication engine may request all of the blocks of setting data, just a subset of the blocks of setting data, or just a single block of the setting data. If the selected blocks of the setting block sent to the authentication engine appear to be genuine, the authentication engine authenticates the consumable product.

In some examples, one of the requested blocks of setting data includes a hash that represents data that is stored in the consumable product's memory, but outside of the digital signature. Such information that is stored outside of the digital signature may also include functional data, but such functional data may be too big to store in the digital signature. Thus, the information can include instructions for making a hash that represents the information. The hash can be stored in the digital signature. During authentication, the host device may cause the hash to be constructed based on the instructions found in the information that is stored outside of the digital signature. If the hashes (from the instructions in the memory and from the digital signature) match, the host device will authenticate the consumable device. If the hashes do not match, the host device may deny authentication of the consumable product. The authentication process may include using both hashes and functional data that is stored directly in the digital signature, just hashes, just the functional data that is stored directly in the digital signature, or combinations thereof.

The same setting data that was used for authentication can also be used to operate the host device. For example, the setting data may include functional data that the host device can use to set the parameters for operating the device with the consumable product. The host device will continue to have access to the setting data after the authentication session is completed.

Figure 6:
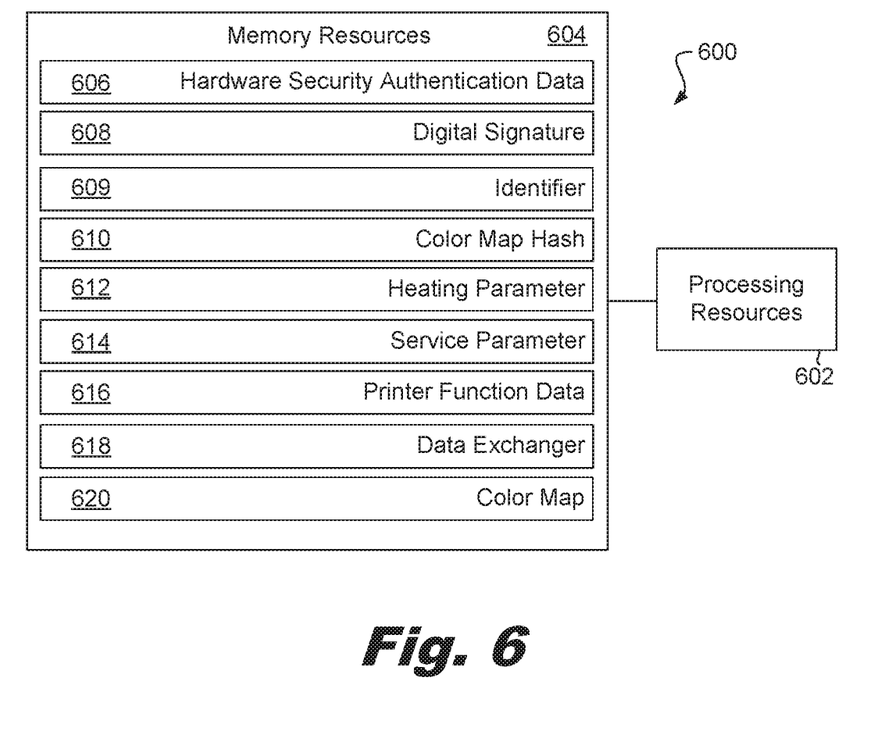
FIG. 6 is a diagram of an example of a protecting system according to the principles described herein.

FIG. 6 is a diagram of an example of a protecting system (600) according to the principles described herein. In this example, the protecting system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the protecting system (600). The programmed instructions shown stored in the memory resources (604) include a consumable product recognizer (620). The data structures shown stored in the memory resources (604) include hardware security authentication data (606), a digital signature (608), an identifier (609), a color map hash (610), a heating parameter (612), a service parameter (614), printer function data (616), and a color map (620).

The memory resources (604) include a computer readable storage medium that contains computer readable program code to cause tasks to be executed by the processing resources (602). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable programmable read only memory, magnetic storage media, other types of memory, or combinations thereof.

The data exchanger (618) represents programmed instructions that, when executed, cause the processing resources (602) to exchange data with a host device according to an authentication protocol. For example, the device may recognize that the consumable product is in a condition to be authenticated if the consumable product is communicating with the device, the consumable product has sent a request for authentication, the consumable product is installed in the device, another condition, or combinations thereof. In response to requests from the host device, the data exchanger (618) sends data to the device.

The requested data may include hardware security authentication data that is intended to be used during a stage of the authentication session where the hardware of the consumable product is being authenticated. The requested data may also include data that is stored in the digital signature (608). For example, the data that may be stored in the digital signature (608) may include the identifier (609), which is unique to the consumable product. Further, the digital signature (608) may include a color map hash (610) that can be constructed from a color map (620) that is stored in the memory resources (604), but not in the digital signature (608). In some examples, other hashes that can be constructed based on information stored in the memory resources (604), but not in the digital signature (608) may also be used in accordance with the principles described herein.

Other information that may be requested during an authentication session from the digital signature (608) may include a heating parameter (612), which may include an indication of the temperature value to set a heater of the printer at while operating a print cartridge. Further, the digital signature (608) may also store a service parameter (614) or other printer functional data (616).

The device may include an authenticating engine that is capable of authenticating the consumable product in response to determining that the digital signature is genuine and/or that the setting data appears to be genuine. The information stored in the digital signature (608) may be requested during the authentication session. However, the setting data in the digital signature (608) may still be available after the authentication session is completed. For example, after authentication, the device may request a parameter, a hash, functional data, or other types of data to determine how to operate the device.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the computer readable instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries may be accessed from a remote location over a network connection while the programmed instructions are located locally. Thus, the protecting system (600) may be implemented on a user device, on a server, on a collection of servers, or combinations thereof.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A non-transitory memory for a consumable product, the memory comprising:
    a non-transitory data storage device;
    an interface for a printing device to interface the data storage device with a host printing device when the consumable product is installed in the host printing device; and
    a digital signature of a consumable product on the data storage device, where the digital signature indicates that an identifier and host device setting data on the data storage device are from a trusted source, wherein the host device setting data comprises a setting for operation of the host printing device.

2. The memory of claim 1, wherein the consumable product is a print cartridge.

3. The memory of claim 1, wherein the host device setting data includes a hash that represents information stored outside of the digital signature and in the non-transitory memory.

4. The memory of claim 3, wherein the information is a color map.

5. The memory of claim 1, wherein the host device setting data includes a temperature setting.

6. The memory of claim 1, wherein individual blocks of the host device setting data are accessible to the host device after authentication.

7. A method comprising:
    upon installation of a consumable product in a host device, accessing a non-transitory memory with the consumable product for a stored digital signature of the consumable product;
    verifying the digital signature with a signature scheme that provides additional bit space in the signature in which host setting data is contained;
    retrieving the host setting data from the verification of the digital signature; and applying the host setting data to the host device, wherein the host device setting data comprises a setting for operation of the host device.

8. The method of claim 7 wherein, further comprising authenticating the consumable product when the host device setting data matches expected setting data.

9. The method of claim 7, wherein the memory further comprises a color map and the digital signature comprises a color map hash, wherein the consumable product is authenticated when the color map and color map hash match.

10. The method of claim 7, wherein the host setting data is stored in a tag-length-value (TLV) format.

11. The method of claim 7, wherein the host device is a printer and the host setting data includes printer functional parameters.

12. The method of claim 11, wherein the printer functional parameters comprise one of: a color parameter, a service parameter, and a heating parameter.

13. A consumable product, comprising:
a consumable component used in operation of a host device, the consumable product packaging the consumable component for installation in the host device, making the consumable component available to the host device;
an electronic circuit with the consumable component, the circuit comprising all of:
a memory device;
an interface, connected to the memory device, to communicate with the host device when the consumable product is installed in the host device;
a storing engine to store a digital signature in the memory where the digital signature indicates that an identifier and host functional data are from a trusted source, the host functional data providing an address or link to data accessible by the host device; and
an exchanging engine to exchange the host functional data with the host device during an authentication session.

14. The product of claim 13, wherein the host functional data includes a hash that represents information that is stored in the memory outside of the digital signature.

15. The product of claim 13, wherein the host functional data includes a printer functional parameter.

16. The product of claim 15, wherein the printer functional parameter comprises a color parameter, a service parameter or a heating parameter.

17. The product of claim 13, wherein the host functional data is stored in the digital signature.

18. The product of claim 13, wherein the host functional data is data that is signed with the digital signature.

19. The product of claim 13, wherein the host functional data is stored in a bit space provided with the digital signature by a verification scheme for the digital signature.

* * * * *